Dec. 23, 1941.  S. J. A. M. BAGNO  2,267,184
MEASURING DEVICE
Filed June 22, 1938  3 Sheets-Sheet 1
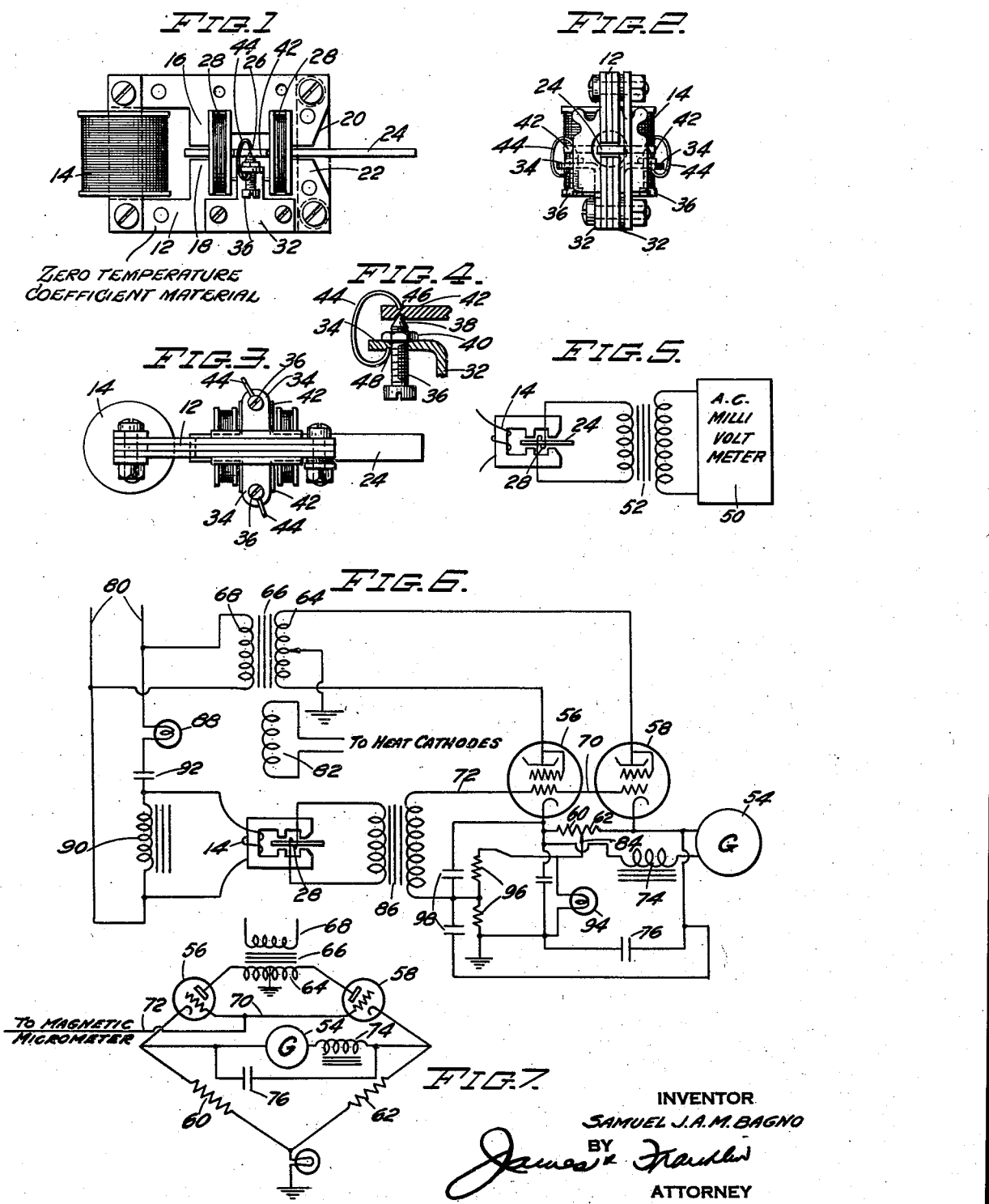
INVENTOR
SAMUEL J.A.M. BAGNO
BY
ATTORNEY Dec. 23, 1941. S. J. A. M. BAGNO 2,267,184
MEASURING DEVICE
Filed June 22, 1938 3 Sheets-Sheet 2
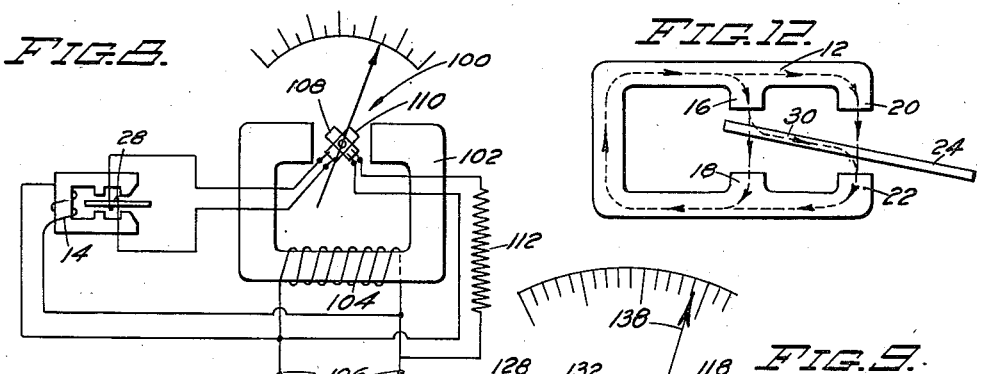
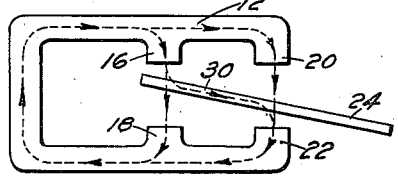
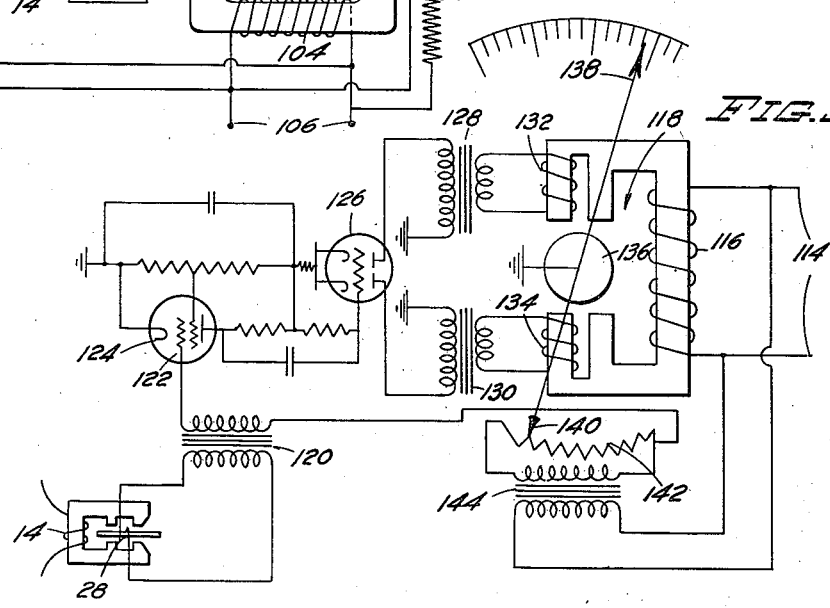
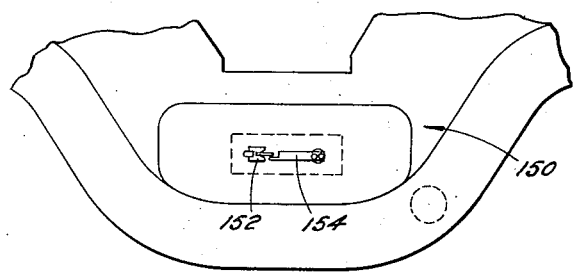
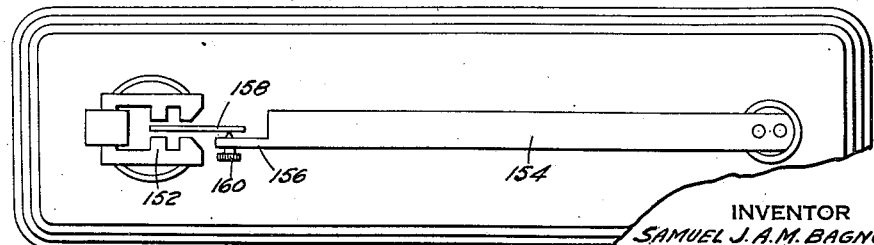
STRAIN GAUGE FOR ROLLING MILL
INVENTOR
SAMUEL J. A. M. BAGNO
BY
ATTORNEY Dec. 23, 1941.     S. J. A. M. BAGNO     2,267,184
MEASURING DEVICE
Filed June 22, 1938     3 Sheets-Sheet 3
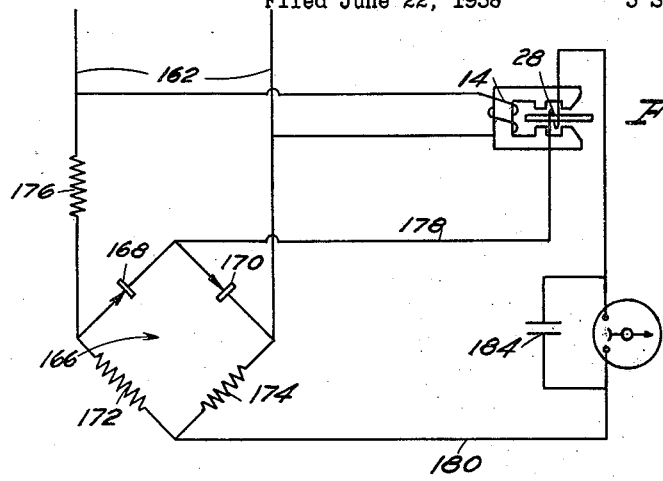
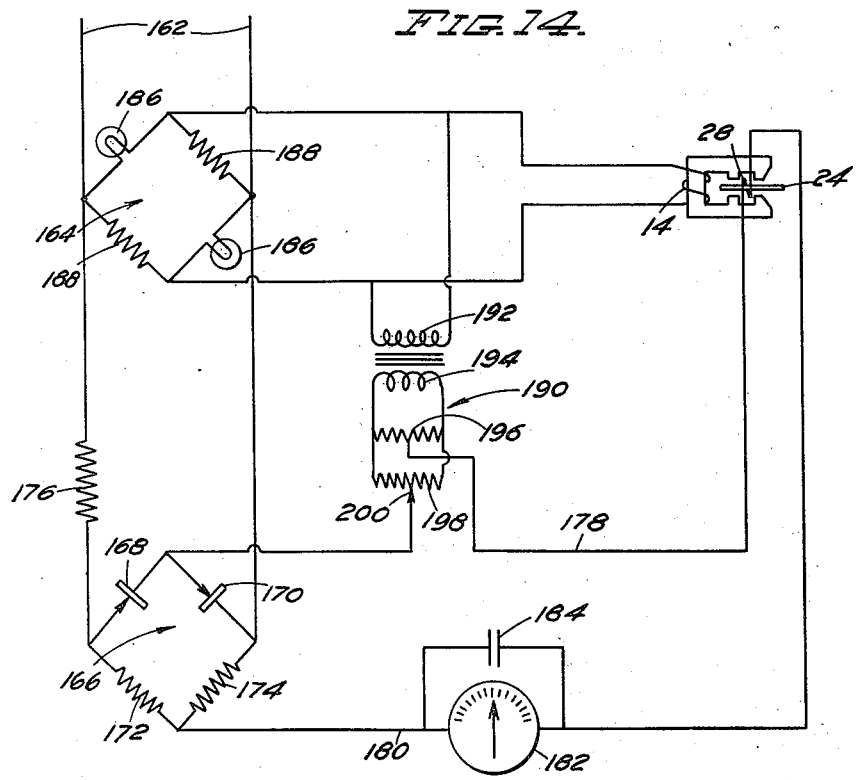
INVENTOR
SAMUEL J. A. M. BAGNO
BY
*James L. Franklin*
ATTORNEY Patented Dec. 23, 1941

2,267,184

UNITED STATES PATENT OFFICE 2,267,184

MEASURING DEVICE

Samuel J. A. M. Bagno, New York, N. Y., assignor to Kurman Electric Co., New York, N. Y., a corporation of New York Application June 22, 1938, Serial No. 215,302

12 Claims. (Cl. 177—351)

This invention relates to measuring devices, especially for measuring minute changes in distance, and relates more particularly to magnetic and electrical means for micrometric measurement.

The primary object of my invention is to generally improve measuring devices, particularly magnetic micrometers.

Magnetic micrometers have already been used, but have suffered from important disadvantages. They are large, cumbersome and critical in construction and tolerance. Perfect symmetry is essential, necessitating coils exactly equal to one another and cores exactly equal to one another. Such a construction is difficult to attain in practice because of the many variables entering into the construction of a coil or a laminated core. One object of my invention is to overcome these disadvantages and to provide a magnetic micrometer which is small, light, inexpensive, and accurate despite the allowance of substantial manufacturing tolerance. A further object is to so design the magnetic micrometer that it may use a single coil for magnetizing the field, and a single coil for the pick-up or measurement, or, if multiple pick-up coils are preferred, these are simply connected in series, thus doing away with the necessity for providing equal coils.

Prior magnetic micrometers have been sensitive to temperature variations, which cause changes in the dimensions of the cores and armature and the air gaps therebetween. This fault has been particularly marked when using the device to measure the rolling pressure in a rolling mill, for heat is transferred from the red hot ingots to the rolling mill and thence to the magnetic micrometer. To overcome this difficulty is a further object of my invention, and to that end, the magnetic parts of the device are made of a magnetic material having substantially zero coefficient of expansion, for example, the metal known commercially as "Invar." Inasmuch as my measuring device, unlike prior magnetic micrometers, is small and light, and requires but little metal, this use of Invar does not appreciably increase the cost of manufacture.

Magnetic micrometers have heretofore been characterized by considerable inertia because of their size, and in accordance with a further feature and object of the present invention, the moving part or armature is made small and light in mass, thus making the device nearly inertialess and well adapted for instant response to fast changes.

Magnetic micrometers as heretofore constructed measure small differences in a large quantity. Specifically, there are two large field coils producing large amounts of flux. The movement of the armature produces a slight unbalance in the equality of these large quantities. In any event, the unbalance measurement is a measurement of small differences between large quantities. It is, therefore, necessarily critical and subject to error. Another object of the present invention is to overcome this difficulty, and stated broadly, the object is to devise a magnetic micrometer in which the measurement is a measurement of large differences in a small quantity. This is done by placing the pick-up coil around an armature which is so related to the field that it handles only a small component of bypass flux rather than the main field flux, said component being widely variable.

Prior arrangements for magnetic measuring devices have utilized a bodily transverse movement of a large armature. This is inconvenient structurally and in accordance with still another object of the present invention, the armature is pivoted on sharp points or edges for oscillating movement, thus providing an arrangement which is inherently symmetrical and well adapted to follow small movements in a sensitive, accurate way.

Another object is to provide suitable circuits for indicating or recording the desired measurement in response to my improved magnetic micrometer.

To the accomplishment of the foregoing, and such other objects as will hereinafter appear, my invention consists in the magnetic micrometer and associated circuit elements and the relation one to the other, as hereinafter are more particularly described in the specification and sought to be defined in the claims. The specification is accompanied by drawings, in which:

Fig. 1 is a side elevation of a magnetic micrometer embodying features of my invention;

Fig. 2 is an end elevation of the same;

Fig. 3 is a plan view of the same;

Fig. 4 is a sectional detail explanatory of the pivoting of the armature;

Fig. 5 is a schematic diagram explanatory of the operation of the measuring device;

Fig. 6 is a wiring diagram for a bridge circuit controlling a direct current galvanometer type instrument;

Fig. 7 shows a part of the diagram of Fig. 6 rearranged in bridge form to clarify the operation of the same;

Fig. 8 is a diagram explanatory of a circuit in which a ratio meter is made responsive to the magnetic micrometer;

Fig. 9 is a diagram explanatory of an arrangement in which a follow-up motor of the induction type is employed in response to the magnetic micrometer;

Fig. 10 illustrates one way in which the magnetic micrometer may be applied to the frame of a rolling mill;

Fig. 11 is a similar view showing the main parts to enlarged scale;

Fig. 12 is explanatory of the operation of the magnetic micrometer;

Fig. 13 is a diagram explanatory of a circuit for controlling a zero center direct current galvanometer by means of the magnetic micrometer; and Fig. 14 is a similar circuit elaborated by certain optionally usable refinements.

Referring to the drawings, and more particularly to Figs. 1 through 4, the magnetic micrometer comprises a field core 12 having a magnetizing coil 14 and spaced poles 16, 18, 20, and 22. An armature 24 extends between said poles and is pivotally mounted at 26. One or more pick-up coils 28 surround the armature 24 between the poles of the field core.

The operation of the device may be explained with reference to Fig. 12, in which it will be seen that the main flow of flux through field core 12 crosses the gaps between the pairs of poles 16, 18, and 20, 22. With armature 24 in horizontal position, no flux flows through the armature in a longitudinal direction. If, however, the armature is tilted downwardly as shown, it is moved nearer the diagonally opposite poles 16 and 22, and a component of field flux flows longitudinally through the armature from left to right, as is indicated by the arrow 30. On reflection, it will be understood that if the armature is tilted upwardly, or counterclockwise, it will be brought nearer the diagonally opposite poles 20 and 18, and a fraction or component of the field flux will flow longitudinally of the armature, but this time it will flow from right to left rather than from left to right. It will also be understood that the quantity of flux flowing through the armature varies with the extent of movement away from mid-position. This variation is linear, for the flux gradient across the air gap between the poles is linear. The amount of movement shown in Fig. 12 is exaggerated, and in practice we deal here with movements of only a few thousandths of an inch. The effect of angularity of the armature is, therefore, ignorable. Even if the armature is moved throughout its extreme range of physically possible movement, I find that a curve showing the response of the device is strictly linear for ninety per cent of the range.

Reverting now to Figs. 1 through 4, the core 12 is preferably a laminated core made of Invar, or equivalent magnetic material. Invar has a substantially zero temperature coefficient of expansion and it is a magnetic material, and I therefore use it with success for the present purpose. The increased cost of Invar over iron is unimportant because of the small amount of material needed. As a specific case, I may mention that the core of the magnetic micrometer shown in the drawings has an overall length of only two inches, a height of 1½", and a thickness of $\frac{3}{16}$". These dimensions are not intended to limit the invention, but are mentioned merely to contrast the present magnetic micrometer with prior known forms which have been massive, weighty and cumbersome in construction.

The armature may be pivoted in any suitable manner. In the case here illustrated, the core is provided with a pair of angle brackets 32 having outwardly projecting arms 34. Bearing screws 36 with hardened pointed ends or fulcrums 38, are threadedly received in arms 34, and are locked in position by suitable lock nuts 40. The armature 24 is generally cruciform in outline, the short cross-arm of the armature projecting sidewardly to overlie the bearing screws 36, as is indicated at 42 in the drawings. Arms 42 are recessed to receive the points 38, the recess preferably being in the form of a broad angled cone the vertex of which is preferably located halfway between the top and bottom of the armature.

The armature is held on the bearing points by a pair of spring wires 44. These wires are loop-shaped, as is best shown in Fig. 4, and are held in place in simple fashion by providing a minute recess or pocket on the upper surface of the armature to receive the upper end of the spring, as is indicated at 46, and a similar pocket on the lower face of arm 34 to receive the lower end of the spring, as is indicated at 48. The upper pocket is preferably located directly over the bearing point.

The pivot is preferably arranged symmetrically, that is, midway in a horizontal direction between the pairs of poles, and midway in a vertical direction between the individual poles. However, this is not essential for successful operation of the device. The pivot may, for example, be located at one pair of poles, in which case the flow of bypass flux longitudinally through the armature will result solely from the movement of the other end of the armature to a position near the upper or lower pole. It is also not essential to magnetize the field core by means of a single perpendicularly disposed magnet, because two horizontal magnets may be used at the top and bottom of the core, but the ability to use a single magnet is an advantage of the present arrangement.

In the present case, I provide two pick-up coils 28, but these are connected electrically in series and function as a single coil. A single coil may be used, and even when two coils are used as shown, it is not essential that they be exactly equal. The coils are wound with their axes in the direction of the armature and are therefore influenced solely by flux flowing longitudinally through the armature. The coils are disposed at right angles to the field coil 14 and are uninfluenced thereby. They are also at right angles to the direction of the flux flowing through the poles 16, 18, and 20, 22, and are therefore uninfluenced thereby. The horizontal arms of the core 12 do not affect the pick-up coils 28 because any effect of the upper arm is neutralized by the equal opposite effect of the lower arm.

The pick-up coils may be mounted on the armature for movement therewith, but I find that a simpler and preferable construction is to mount the pick-up coils rigidly and stationarily in the field core structure. The openings through the coils are large enough to receive the armature and permit movement thereof. In the present case, the field core laminations are so shaped as to provide pockets which snugly receive the top and bottom portions of the pick-up coils, as is clearly shown in Fig. 1 of the drawings.

The manner in which the magnetic micrometer may be connected in circuit is schematically indicated in Fig. 5. The field coil 14 is energized from any suitable source, for example, an ordinary alternating current power line. The flux flowing longitudinally of the armature 24 links with the pick-up coil 28 and induces a potential thereacross. This potential may be read on any suitable instrument, such as an A. C. milli-voltmeter 50. The pick-up coil and instrument are shown coupled through a suitable transformer 52. If it is desired to read the instrument in only one direction, the armature is tilted to only one side of mid-position. If the instrument is to be read in two directions and responds to a reversal in phase, the armature may be tilted to either side of mid-position.

I shall next describe a number of more elaborate circuits for obtaining an indicator or recorder response to the pick-up coil of the magnetic micrometer. Referring first to Figs. 6 and 7, I there show a bridge circuit using electron emission tubes and making it possible to obtain the desired response on an instrument of the direct current rather than alternating current type, specifically, a direct current galvanometer 54. I may preliminarily explain that the output of the pick-up coil is small, and this makes amplification desirable. Amplification is conveniently obtainable by using electron emission tubes, but if tubes are used, it is better to utilize direct current rather than alternating current from the amplifier, because direct current instruments are cheaper and more rugged than alternating current instruments, and more torque is obtainable with less power input. These advantages are especially good for recording purposes.

The idea underlying the circuit of Fig. 6 may be clarified with reference to Fig. 7, in which it will be seen that triodes 56 and 58 are connected in the upper arms of a bridge circuit which is completed by resistors 60 and 62 in the lower arms. The anodes of tubes 56 and 58 are connected in series relation to the secondary 64 of a transformer 66 the primary 68 of which is connected to an ordinary alternating current line. The mid-point of transformer secondary 64 is grounded. It will be evident that the anodes are made positive in alternation and that the tubes 56 and 58 therefore tend to become conductive in alternation. The control electrodes or grids of the tubes are connected in parallel, as is indicated by conductor 70, and are connected through conductor 72 to the pick-up coil of the magnetic micrometer. The field of the magnetic micrometer is energized from the same alternating current line, and the potential applied to the control electrodes of the tubes is therefore synchronous with the potential applied to the anodes. However, the anodes are polarized in series or phase opposition, while the control electrodes are made more positive or more negative in parallel or in phase. On reflection, it will be seen that with this arrangement only one or the other of the tubes is made conductive, depending on the phase of the energy from the pick-up coil of the magnetic micrometer. One tube remains non-conductive because when its anode is positive, its grid is more negative, and when its grid is more positive, its anode is negative. The other tube is made intermittently conductive because when its anode is positive its grid is more positive, and when its anode is negative its grid is more negative. It is convenient to speak of the tubes as conductive or non-conductive, but true cut-off is unnecessary, and mere inequality of current flow is enough.

The bridge is thus thrown off balance, resulting in a flow of current through the direct current galvanometer 54. The current reaching the galvanometer is preferably filtered as by means of a choke 74 and bypass condenser 76. The direction of response of the galvanometer depends upon whether the armature is tilted upwardly or downwardly. The amount of response depends upon the potential supplied from the pick-up coil, which in turn depends on the amount of tilt of the armature.

The significant thing about the relation of the tubes 56 and 58 is that electrodes of one type tending to make the tubes conductive are energized in series or alternation, while electrodes of another type also controlling the conductivity of the tubes are energized in parallel or simultaneously. This point is mentioned because a generally similar result may be obtained by connecting the anodes in parallel and the grids in series, instead of vice versa as shown.

Referring to Fig. 6, the tubes are shown at 56 and 58, and are illustrated as tetrodes though they function as triodes. This is so because the particular tubes illustrated are type 6L6 and the screen grids are connected to the anodes, thus converting the tubes to triodes. The transformer for polarizing the tubes is shown at 64, 66, 68, and is energized from alternating current line 80. The additional secondary 82 on transformer 66 is merely to provide current for heating filaments of the cathodes of tubes 56 and 58. The resistors 60 and 62 which complete the bridge are shown as one continuous resistor tapped at the point 84. In a typical case, I have used a value of 300 ohms for this resistor. The choke 74 and by-pass condenser 76 for galvanometer 54 are clearly shown in the drawing, and these may have a value of, say, 20 h. and 4 mfd., respectively. The parallel connection of the control electrodes of the tubes is shown at 70, as well as their connection 72 to any suitable impedance matching transformer 86. The primary of this transformer is connected to pick-up coil 28 of the magnetic micrometer, the field winding 14 of which is connected to alternating current line 80.

A number of refinements are introduced in the circuit to compensate for line voltage fluctuation. The voltage to field coil 14 of the magnetic micrometer is regulated by means of a high resistance lamp 88. A special lamp with an iron filament may be used, but I find that an ordinary tungsten filament lamp, say, of 7 watts, is suitable. Choke 90 has a value of, say, 20 h. and condenser 92 has a value of, say, 1 mfd. The condenser adjusts the phase of the current supplied to the field coil 14 and increases the current flow through the inductive load so that there is a large current flow despite the insertion of the lamp 88. The lamp acts as a voltage regulating device because an increase in voltage causes an increase in temperature, with consequent increase in resistance of the filament.

Further voltage regulation is obtained by means of another lamp 94 which may also have a value of, say, 7 watts. This lamp is used to provide grid bias potential for the tubes, and is therefore connected between the tube cathodes and ground. The bridge resistors 60 and 62 are in series with the lamp and also function to establish a part of the bias voltage. The operation of lamp 94 is such that on increase in line voltage, the bias resistance is increased, thus increasing the bias or making the grids more negative, and this in turn decreases the sensitivity of the tubes, thus helping compensate for the increase in line voltage.

It happens that the bias voltage developed by lamp 94 is higher than is wanted, and the actual voltage applied to the grids is reduced or halved by voltage dividing resistors 96. In the specific case illustrated, these resistors had a value of 0.5 meg. They are by-passed by condensers 98 which filter the bias potential in order to obtain a steady bias, and in a typical case, these condensers have a value of 0.5 mfd. Instead of using voltage dividing resistors 96, the bias can be made lower by simply using a lower resistance lamp, but such a lamp will not heat up or cool off as fast as the high resistance lamp shown, and therefore would not be as sensitive in response to quick changes in line voltage.

Another and completely different method of utilizing the output of the magnetic micrometer is schematically illustrated in Fig. 8. In this arrangement, the instrument generally designated 100 is a ratio meter and is so used in the present circuit as to automatically compensate for changes in line voltage. The ratio meter comprises a field core 102 excited by a magnetizing coil 104 energized from an ordinary A. C. power line 106. The moving element of the instrument comprises coils 108 and 110 arranged at right angles to one another. One of the coils, in this case the coil 110, is connected to pick-up coil 28 of the magnetic micrometer. The field coil 14 of the magnetic micrometer is energized from the same alternating current line 106. The other moving coil 108 is also energized from line 106, but a resistor 112 is interposed to reduce the current to a desired value reasonably commensurate with the current from the pick-up coil. The coils 108 and 110 produce flux components the resultant of which aligns itself with the field flux running between the poles of the field core. Movement of the armature of the magnetic micrometer changes one component and therefore the angle of the resultant, and this in turn changes the position of the moving coil system and pointer. Changes in line voltage, however, have no effect because a change of, say, ten per cent reduces not only the vector of coil 108 by ten per cent, but at the same time reduces the vector from pick-up coil 28 and meter coil 110 by ten per cent, so that the direction of the resultant remains constant. The position of the pointer is therefore unchanged.

Referring now to Fig. 9, I show still another circuit utilizing the output of the magnetic micrometer, and in this case, the motion of the armature is indicated or recorded by means of a follow-up motor of the induction type in accordance with an invention which is described in greater detail and claimed in my copending application, Serial Number 215,303, filed concurrently herewith.

The present description will therefore be kept brief. The field coil 14 of the magnetic micrometer is excited from an alternating current line which is preferably the same alternating current line as the line 114 which is used to excite the field coil 116 of an induction motor generally designated 118. The energy from pick-up coil 28 of the magnetic micrometer is fed through a suitable transformer 120 to the control electrode 122 of tube 124. The output of this tube is applied to a pair of tubes or a twin tube 126. The plate supply of tubes 126 is alternating current supplied through transformers 128 and 130 from the shading coils 132 and 134 of induction motor 118. The shading coils and transformers are so phased that the anodes of tubes 126 operate alternately, one plate becoming positive while the other is negative, and vice versa. When the plate is positive, the tube is conductive, and when the plate is negative it is non-conductive. During the next half cycle, the halves of twin tube 126 alternate in conductivity, the one that was previously non-conductive now tending to become conductive, and vice versa.

Inasmuch as the input energy from pick-up coil 28 is synchronous in frequency and proper in phase, and inasmuch as it is applied to the grids of tubes 126 in parallel or in unison, the input energy tends to make the tubes simultaneously conductive or non-conductive. The anodes, however, are in phase opposition, and this results in one side of the tube becoming more conductive and the other less conductive, for on one side the anode and grid become positive together and negative together, while on the other side, when the anode is positive the grid is more negative, and when the grid is more positive the anode is negative. In effect, there is a difference in the load on shading coils 132 and 134, one being made more conductive and the other more resistive. In this way, one shading coil predominates over the other and produces a field component which is rotatably displaced from the main field and which is out of phase with the main field, thus causing self-starting rotation of the rotor 136 of the induction motor. The direction of rotation of the rotor depends upon which of the shading coils 132 or 134 is short-circuited or made more conductive.

Rotor 136, in revolving, moves the pointer or recording pen 138, and at the same time moves a contact arm 140 over a potentiometer resistance 142. Resistance 142 is connected to the main alternating current line 114 through a suitable step-down transformer 144. The variable potential tapped from potentiometer resistance 142 is applied in series with the secondary of the input transformer 120, and the connection is such that the potentiometer voltage is applied in phase opposition to the input voltage. The potentiometer output may, for convenience, be called neutralizing energy and is applied to buck or neutralize the input energy from the magnetic micrometer. It is only the resultant or unneutralized energy that is applied to the amplifier tube 124 and thence to the twin tube 126.

Rotor 136 moves contact arm 140 in such a direction as to tend to reduce the resultant of the neutralizing and input energies to zero. If the input voltage increases, that one of the shading coils is short-circuited which causes rotation of the rotor in such direction as to increase the potentiometer or neutralizing voltage. When the neutralizing voltage equals the input voltage, the shading coils are either open-circuited or equally shunted, and the induction motor is so arranged that in such case its torque is reduced to zero and it comes instantly to rest. If now the input from the magnetic micrometer is decreased, the neutralizing energy exceeds the input energy, and a resultant is applied to the control tubes for the shading coils, but this energy is reversed in phase relative to that previously referred to, and therefore it is the opposite side of the twin tube 126 that is made conductive, and consequently, it is the other of the shading coils that is short-circuited. The rotor 136 of the induction motor, therefore, operates in opposite direction to decrease the neutralizing energy until it equals the input energy from the magnetic micrometer.

In this way, the recording pen at all times follows the movement of the armature of the magnetic micrometer, and the recorded value is independent of fluctuations in line voltage because any change in pick-up voltage resulting from a change in line voltage is at the same time accompanied by an equal change in the neutralizing voltage obtained from the potentiometer, for it also is connected to the line and is responsive to line fluctuations.

I have so far described the magnetic micrometer and some methods of utilizing the output therefrom, but I have not made particular reference to specific applications or uses of the magnetic micrometer itself. It may be used to measure the elongation of a test bar placed under stress in a testing machine in order to determine the characteristics of the metal being tested. The magnetic micrometer may be used as a comparator micrometer, that is, to measure the dimension of a series of machine parts which are kept within a tolerance of a few thousandths of an inch. In such case, the total range of measurement is very small, yet the exact measurement of the successive parts is determined on a large, easily read scale of an electric instrument so that the parts may be sorted in accordance with their dimension. The magnetic micrometer may also be used as an actual micrometer for measuring the thickness of very thin sheets, such as sheets of paper, or metal foil or the like. In connection with this use, it may be mentioned that the thinness of the armature is of advantage because it eliminates errors due to changes in thickness of the armature in response to changes in temperature.

The magnetic micrometer may also be used to measure the elongation of a part of the frame of a rolling mill, particularly the part between the bearings of the rolls, as a measure of the stress in the frame, and consequently, as a measure of the pressure between the rolls. Instead of measuring the vertical elongation of the frame between the rolls, it is also possible to obtain the desired stress measurement in an indirect manner, as by measuring the spread or deformation between the sides of the frame at one end, say, the lower end thereof. This arrangement will be described in greater detail with reference to Figs. 10 and 11. Referring to Fig. 10, the lower end of one side of the frame of the rolling mill is generally indicated by the numeral 150. Stress applied to the frame by pressure on the rolls causes a spreading or opening of the frame at the end 150. This spreading or deformation of the frame is measured by means of magnetic micrometer 152 the armature of which is moved by an arm 154. The idea will be clear from inspection of Fig. 11, which shows the parts to larger scale. It will be evident that spreading of the frame under load causes an upward movement of the free end 156 of arm 154. This in turn moves armature 158 through the agency of a suitable and preferably pointed adjusting screw 160.

In Fig. 13 I illustrate how the output of the magnetic micrometer may be read upon a direct current galvanometer having a zero center, that is, operating in either direction. This arrangement uses rectifiers, but the rectifiers may be ordinary dry rectifiers such as known copper oxide rectifiers, and no vacuum tubes are needed. Referring to Fig. 13, the field coil 14 of the magnetic micrometer is energized from an ordinary alternating current line 162. Energy from line 162 is applied across a rectifier bridge 166 having rectifiers 168 and 170 in two legs, and resistors 172 and 174 in the other two legs. The rectifiers are poled alike with respect to the line current. The potential across the bridge may be reduced to a desired value by means of the series resistor 176. The reduced potential applied to the bridge is, however, kept large enough to dominate any potential obtained from the pick-up coil 28 of the magnetic micrometer. Potential from pick-up coil 28 is applied to the opposite corners of the bridge by means of the conductors 178 and 180, and the zero center direct current galvanometer 182 is connected in series with conductor 180.

On reflection, it will be seen that the rectifiers 168 and 170, while arranged in series with respect to the line current, are arranged in parallel with respect to the pick-up coil current, and in respect to the latter, the rectifiers are oppositely poled. The current flow through one rectifier is increased by the pick-up coil current, and the current flow through the other rectifier is decreased by the pick-up coil current. A change in phase at the pick-up coil changes the effect on the rectifiers, and that which previously had a reduced current then has an increased current, and vice versa. It is thus possible to use the magnetic micrometer on either side of center as in the case of a comparator micrometer, and the direct current galvanometer 182 is properly responsive. The galvanometer may, if desired, be shunted by a condenser 184.

The circuit is illustrated in somewhat more elaborate form in Fig. 14. The circuit of Fig. 14 differs in two main respects, first, the introduction of the voltage regulating bridge 164, and second, the zero center adjusting means generally designated 190. Referring to the bridge 164, this comprises low power lamps 186 in two opposite legs, and resistors 188 in the other two opposite legs. The bridge is normally unbalanced a substantial amount, and the unbalance of the bridge causes a current flow through field coil 14. Upon increase in line voltage, the lamps are heated to a higher temperature, and they increase in resistance. The initial unbalance of the bridge is such that this increase tends to more nearly balance the bridge. This, of course, reduces the portion of the line potential applied to the field coil 14. On the other hand, a decrease in line voltage decreases the lamp resistance and increases the unbalance of the bridge, thereby increasing the portion of the line potential applied to the field coil 14. In this way the potential applied to the field coil is stabilized and regulated to a steady value despite fluctuations in line voltage.

Referring now to the zero compensating circuit indicated at 190, this comprises essentially a means to apply a potential which may be either added to or subtracted from the pick-up coil potential, so that the instrument 182 may be adjusted to zero position while the armature 24 is adjusted to a desired position. In some cases this electrical adjustment is more convenient than a mechanical adjustment of the armature position. A part of the energy being supplied to field coil 14 is applied to a transformer primary 192 the secondary 194 of which is connected to a voltage-dividing resistance 196 the mid-point of which is connected to the pick-up coil 28. The ends of resistance 196 are connected to the ends of a potentiometer resistance 198 the contact 200 of which is connected to the bridge 166. With contact 200 in true mid-position, there is no effect on the pick-up coil potential, but by varying the contact 200 to one side or the other, the pick-up coil potential may be increased or diminished. This adjustment can be regulated to establish zero for the galvanometer 182 in respect to a desired center or zero for the magnetic micrometer.

It is believed that the construction and operation, as well as the many advantages of my improved magnetic measuring device will be apparent from the foregoing detailed description. The device is small, light, and inexpensive to manufacture. It is accurate even when made with substantial manufacturing tolerance. There is no need for winding coils of exact equality, or for producing magnetic cores of exact equality. The core is so small that it may be made of a temperature compensated magnetic material such as Invar, thereby obviating changes in response to temperature variation. The moving part of the device is a thin, light strip of metal, and has no appreciable inertia, and is therefore well adapted to follow rapid movements. This armature is moved with a pivotal, rather than bodily transverse, movement, and its movement may therefore be kept accurate and sensitive, and it is inherently symmetrical. In general, the device is characterized by the very important advantage that it measures large differences in a small quantity, rather than small differences in a large quantity. This is so because it deals with an extremely wide range of change of a small factor, namely, the bypass flux flowing through the armature in a longitudinal direction. This flux is zero when the armature is in mid-position. A plurality of pick-up coils may be used, but even when two coils are used, as in one preferred form of the invention, the coils are simply connected in series and act electrically as a single coil, and therefore need not be exactly equal to one another. The measuring device is adapted for a variety of uses, and its output may be applied to indicating or recording instruments of varied character, such as a direct current instrument responsive to unbalance of a bridge, an alternating current follow-up motor of the shaded hole induction type arranged to act as an indicator or recorder, or a ratio meter, and these circuits may be made independent of variations in line voltage, all as has previously been described.

It will be apparent that while I have shown and described my invention in several preferred forms, many changes and modifications may be made in the structures and circuits disclosed without departing from the spirit of the invention defined in the following claims.

I claim:

1. In combination, an alternating current source, a magnetic measuring device comprising a field core having poles with a gap therebetween, a field coil connected to said source for magnetizing said core, a pivoted armature having a part disposed in said gap, and having another part so related to said core that a part of the magnetic flux flows longitudinally of the armature, the amount of flux varying with the position of the armature, and a pick-up coil surrounding the armature for delivering an alternating current signal the magnitude of which depends on the position of the armature.

2. A magnetic micrometer comprising a field core made of Invar and having poles with a gap therebetween, a field coil for magnetizing said core, a pivoted armature having a part disposed in said gap, and having another part so related to said core that a part of the magnetic flux flows longitudinally of the armature in one direction when the armature is tilted toward one pole and in the other direction when the armature is tilted toward the other pole, and a stationary pick-up coil surrounding the armature.

3. In combination, an alternating current source, a magnetic measuring device comprising a field core having poles, a field coil connected to said source for magnetizing said core, said coil surrounding a leg of the core extending in the direction of the poles, an armature disposed between said poles and extending approximately perpendicular to the field coil and poles, means to move said armature in such a manner relative to the poles that it is traversed longitudinally by a small component of flux from the field, and a pick-up coil surrounding the armature for delivering an alternating current signal the magnitude of which depends on the position of the armature.

4. A magnetic micrometer comprising a field core made of Invar and having poles, a field coil for magnetizing said core, said coil surrounding a leg of the core extending in the direction of the poles, an armature disposed between said poles and extending approximately perpendicular to the field coil and poles, means to move said armature in such a manner relative to the poles that it is traversed longitudinally by a small component of flux from the field, and a stationary pick-up coil surrounding the armature with its axis extending perpendicularly to the axis of the field coil.

5. In combination, an alternating current source, a magnetic measuring device comprising a field core having two spaced pairs of poles, a field coil connected to said source for magnetizing said core, an armature extending between said poles, a pivot mounting said armature for oscillation about an axis disposed between said pairs of poles, and a pick-up coil surrounding said armature for delivering an alternating current signal the magnitude of which depends on the position of the armature.

6. In combination, an alternating current source, a magnetic measuring device comprising a field core having three spaced legs, two of said legs being interrupted to form poles with air gaps therebetween, a field coil surrounding the third leg and connected to said source, an armature extending through said air gaps, a pivot mounting said armature for oscillation between said poles, whereby tilting of said armature brings it nearer diagonally opposite poles so that flux flows longitudinally through the armature, and a pick-up coil surrounding said armature for delivering an alternating current signal the magnitude of which depends on the position of the armature.

7. A magnetic micrometer comprising a field core made of Invar and having three spaced legs, two of said legs being interrupted to form poles with air gaps therebetween, a field coil surrounding the third leg, an armature extending through said air gaps, a pivot mounting said armature for oscillation between said poles, whereby tilting of said armature brings it nearer diagonally opposite poles, and a pick-up coil surrounding said armature.

8. In combination, an alternating current source, a magnetic measuring means comprising a field core having three spaced parallel legs, two of said legs being interrupted to form poles with air gaps therebetween, a field coil connected to said source and surrounding the third leg with its axis extending in the direction of the legs, a relatively thin, light-weight armature extending through said air gaps in a direction generally perpendicular to said field coil, a pivot mounting said armature for oscillation about an axis disposed symmetrically between said poles with the armature at the middle of said air gaps, whereby tilting of said armature brings it nearer diagonally opposite poles so that flux flows longitudinally through the armature, and a pair of series connected pick-up coils surrounding said armature for delivering an alternating current signal the magnitude of which depends on the position of the armature, said pick-up coils being disposed with their axes perpendicular to the field coil, said pick-up coils being disposed between the poles and on opposite sides of the aforesaid pivot.

9. A magnetic micrometer having a field coil and a pick-up coil in transformer relation, and a field core made of Invar in order to avoid errors caused by variations in temperature of the magnetic micrometer.

10. A magnetic micrometer having a field coil and a pick-up coil in transformer relation, and a field core and a movable armature both made of Invar in order to avoid errors caused by variations in temperature of the magnetic micrometer.

11. In combination, an alternating current source, a magnetic measuring device comprising a field core having three spaced legs, two of said legs being interrupted to form poles with air gaps therebetween, a field coil surrounding the third leg and connected to said source, an armature extending through said air gaps, means to move said armature in such a manner as to bring spaced parts of the armature nearer poles of opposite polarity so that flux flows longitudinally through the armature, and a pick-up coil surrounding the armature for delivering an alternating current signal the magnitude of which depends on the position of the armature.

12. A magnetic micrometer comprising a field core made of Invar and having three spaced legs, two of said legs being interrupted to form poles with air gaps therebetween, a field coil surrounding the third leg, an armature extending through said air gaps, means to move said armature in such a manner as to bring spaced parts of the armature nearer poles of opposite polarity so that flux flows longitudinally through the armature, and a pick-up coil surrounding said armature.

SAMUEL J. A. M. BAGNO.